Figures 2, 3:
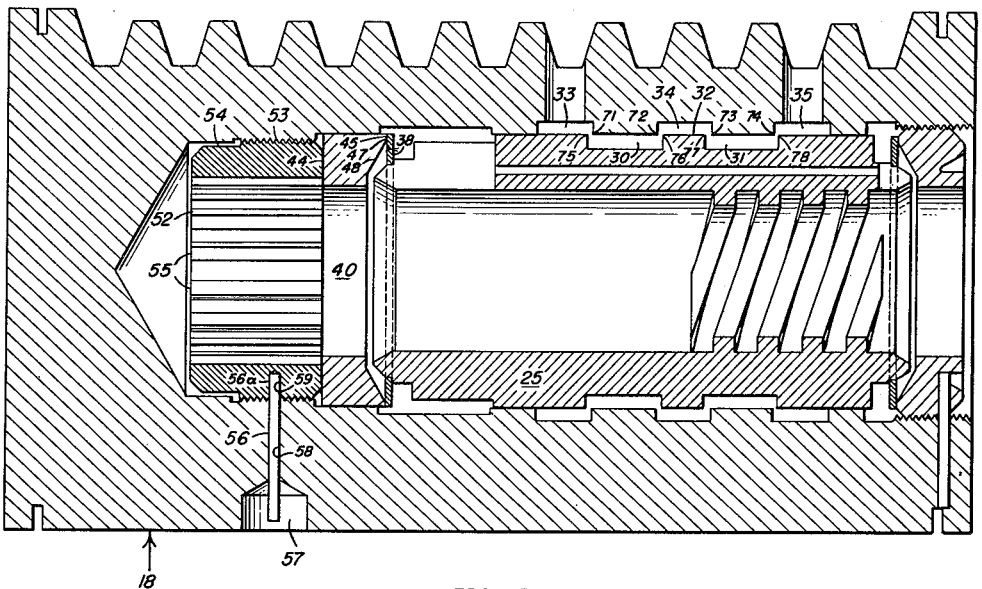

July 20, 1965 R. H. SHEPPARD 3,195,575
CENTRALIZING VALVE GROOVES TO SECURE EQUAL REVERSIBILITY
Filed Sept. 27, 1963 2 Sheets-Sheet 1
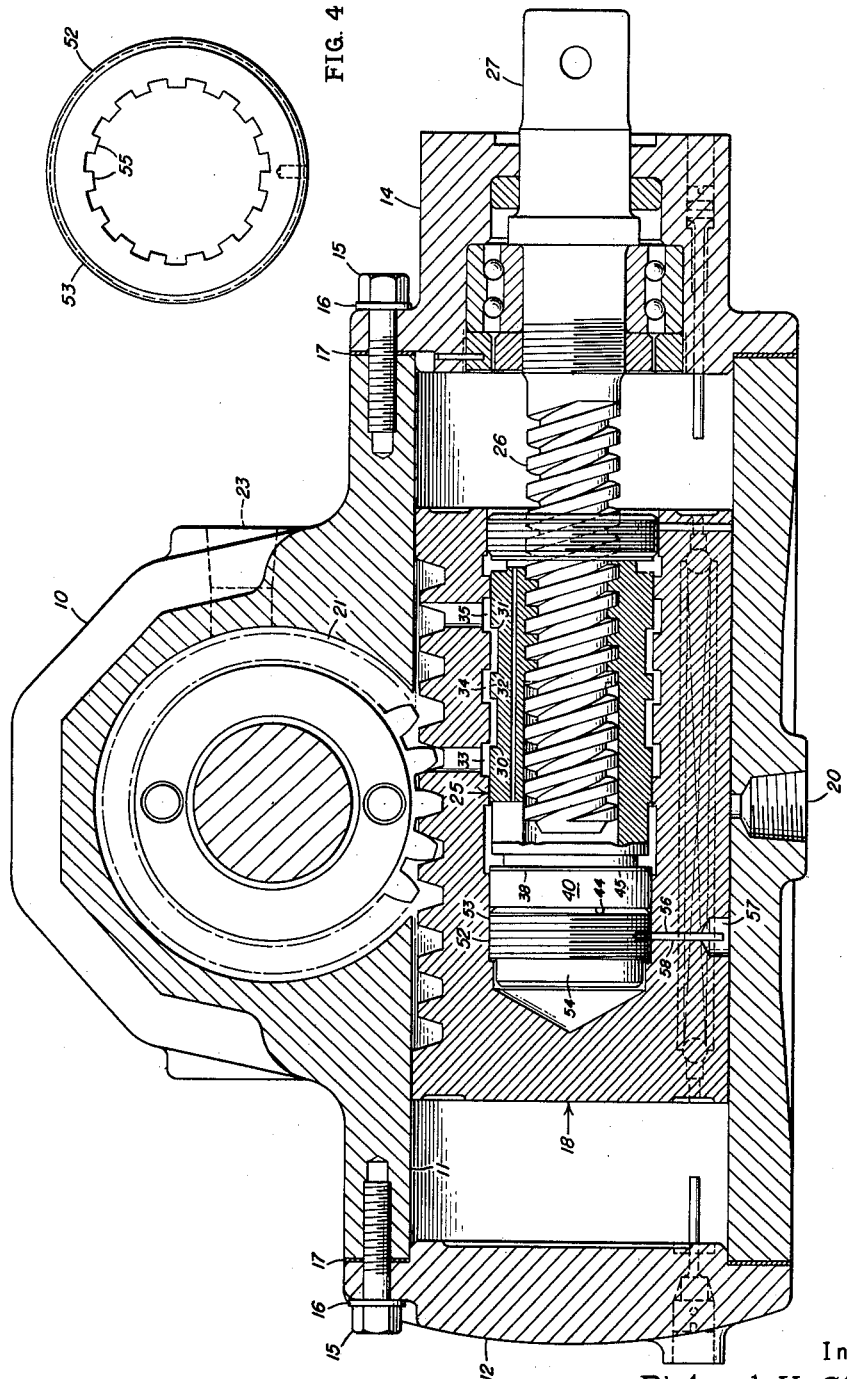
Inventor:
Richard H. Sheppard
By Henry H Snelling
his Attorney

July 20, 1965

R. H. SHEPPARD 3,195,575

CENTRALIZING VALVE GROOVES TO SECURE EQUAL REVERSIBILITY

Filed Sept. 27, 1963

2 Sheets-Sheet 2

Inventor:
Richard H. Sheppard

By Henry H. Snelling
his Attorney

United States Patent Office 3,195,575
Patented July 20, 1965

3,195,575
CENTRALIZING VALVE GROOVES TO SECURE EQUAL REVERSIBILITY
Richard H. Sheppard, 101 Philadelphia St., Hanover, Pa.
Filed Sept. 27, 1963, Ser. No. 312,077
2 Claims. (Cl. 137—625.69)

This invention relates to power steering gears for vehicles, particularly those for heavy duty work in connection with highway construction and wherein ground engaging wheels are turned by rotation of an actuating shaft having a threaded engagement within a valve slidable in a piston, the valve and piston having cooperating external and internal grooves to distribute fluid selectively to the two ends of the piston.

The principal object of the invention is to provide accessible means for precisely centralizing an external groove of the valve with relation to internal grooves of the piston to insure equal steering effort in each direction and equal reversibility.

A second object of the invention is to make the steering gears less expensive by providing adjustable seats for the washer-shaped springs at each end of the valve thereby avoiding the cost of maintaining the extreme accuracy of certain dimensions in the valve and piston previously required where only one of these spring seats is accessible for adjustment so that certain critical dimensions had therefore to be held within about a thousandth of an inch, a difficult job where the parts are of hardened steel.

When the vehicle is moving straight ahead the pressure fluid enters inlet port 20 and passes from the central groove 34 in the piston equally to grooves 30 and 31 in the valve so that the piston does not move because these valve grooves are, in usual fashion, directly connected through the piston to the left and right chambers, the fluid passing equally to the chambers on the two sides of the piston. The pressure fluid also exits through the two vertical (radial) bores above the grooves 33 and 35 and then between the teeth of the gear and of the rack to the exit port 23 (FIG. 1) and the pump (not shown). But when the piston is moved to either side by moving the steering wheel which turns the actuating shaft 27, this moves valve 25 by screw 26, so oil passes for example from the entrance at 20 through groove 34 to groove 30, in the piston to one side chamber and the opposite chamber simultaneously releases pressure in the usual manner. The check valves shown in FIGURES 1 and 2 are for limiting the travel of the piston and have no bearing on the claimed adjustment of the spring seats.

The present invention introduces two new parts to the steering gear shown in my Patent No. 3,092,083, dated June 4, 1963, but in so doing lowers the cost materially. In the patented steering gear while the right hand nut is readily adjustable to position the two flat spring washers and thereby the location of the valve, the left hand spring seat is at a fixed position on the piston and this requires that the distances from it to the four margins of the valve grooves and the four margins of the piston grooves be maintained at such close tolerances as mentioned. The left hand end of the valve is therefore called the "business end" and it is only with extreme care that the outer upper corner of the left hand washer spring can be correctly located.

By making it possible to adjust the spring seats at both ends the two added parts lessen the need for extreme accuracy to half the distances previously required, i.e. only to the overall distance between the outer margins of the valve groves as a whole and the similar but lesser dimension as to the piston which has but two grooves. In the patented structure it was necessary to have accuracy all the way from the two left hand spring seats to the nearer margin of the far right hand groove of the piston and the distance to the nearer margin of the far right groove in the valve whereas by being able to adjust the spring seats at each end of the valve the relationship between the left hand spring seats no lnger has to be held in exact relation to the margins of these groves and hence these dimensions are no longer critical. The new ability to adjust the left end seat also permits the taking up necessary to compensate for wear.

In the drawings:
FIGURE 1 is a central horizontal section, with certain parts shown in elevation more clearly to reveal details of the construction;
FIGURE 2 is a section of a modification;
FIGURE 3 is an enlarged section of the piston;
FIGURE 4 is an end elevational view of an adjusting nut, on the scale of FIGURE 3.

In the drawings, the housing 10 has a bore 11, closed at the left by a cylinder head 12 secured by the usual bolts 15, lock washers 16 and gaskets 17 and closed at right by a bearing cap 14. In the bore 11 a piston 18 moves in both directions in accordance with distribution of presure fluid entering through inlet port 20 and discharging through chamber 21 and exit port 23 to a pump (not shown).

The valve 25 within and coaxial with the piston 18 is moved axially by engagement with the threaded portion 26 of actuating shaft 27 to control the flow of oil in the usual manner as stated in my patent cited. The two external grooves in the valve 25 are numbered 30 and 31 and these cooperate with internal grooves 33, 34 and 35 in the piston. The improvement lies with the ability to adjust the upper outer seat of the left hand washer 38 whether the access is obtained from the right or from the left of the piston as in FIGURE 1 or FIGURE 2 respectively.

In FIGURES 1 and 3, instead of the left spring washer 38 being seated on the piston itself, two additional members are added, these including an annular member 40 having a relatively wide face 44 and a relatively narrow face 45 engaging respectively the adjusting nut 52 and the annular spring washer 38. The face 45 is bounded innerly by a circular contact edge 47 between face 45 and sloping face 48 at an obtuse angle of about 120° whereby this annular rounded edge takes all the punishment thus avoiding cold flow at the point of maximum bearing. The faces 45 and 44 should be exactly parallel and the edge 47 rounded by a radius between .018" and .013", the member 40 being about two inches in diameter.

The second additional member is a nut 52 having a threaded engagement 53 with the piston 18 for adjustment, an extension 54 to give added axial length and fifteen involute spline teeth 55 runing the full length of the nut and its extension. A pin 56 extending from a recess 57 through bore 58 in the piston and a corresponding hole in the nut, bored after the nut is adjusted, locks the nut firmly in place.

In order to make the adjustment, the actuating shaft 27 is withdrawn and an expansion wrench of well known design having blades outwardly movable is inserted in the hollow of the valve 25 and pushed under the adjustable seat 52 so as to be in position to move the blades to engage the opposite splines 55. Careful manipulation of the nut 52 will insure that the land 32 between grooves 30 and 31 will be positioned so that the space between it and the sides of groove 34 on both sides of the land 32 will be precisely equal. The wrench is now withdrawn and the piston 18 gently pushed forward to uncover the recess 57. The extension 59 of the bore 58 is now drilled and the pin 56 is installed so that its end 56a is between fifteen and thirty thousandths of an inch from the wall of the piston. When necessary to change the seating of nut 52 the recess 57 allows ready entry of a long-nose plier to pull out the pin and obviously a new short hole is necessarily bored in the adjusting nut.

Referring now to FIGURE 2 the cylinder head 12 is removable as in FIGURE 1 and this gives access to the left hand end of the piston. A plug 60 adjustable within the piston 18 by means of threads 61 is provided so that the plug 60 becomes the seat for the spring washer 38. To permit ready adjustment of the plug 60 a kerf 63 is made centrally of the face 64 of the plug so as to receive a screw driver with which to rotate the plug about its axis. When the plug has thus been precisely positioned it is locked by pin 66 passing through a bore 67 previously prepared in the piston and when the adjustment has been chosen the short coextensive hole 68 is bored in the plug so that the inner end 69 of the pin may pass into the annular groove 65 leaving sufficient space to allow entry of a screw driver beneath the pin to raise it out of the bore 67 within reach of a pair of pliers when further adjustment is to be made. The plug has a seal 62.

In FIGURE 3 the distance between point of engagement 47 on the ring 40 (or the similar rounded edge 47a on the plug in FIG. 2) and the annular seat 70 on the valve no longer have to be held in exact relation with points 71, 72, 73 and 74 in the piston and points 75, 76, 77 and 78 in the valve. Formerly the dimensions 70 to 76 on the valve from the point corresponding to 47 on the piston to point 71 had to be maintained with extreme accuracy but under the present invention these dimensions are no longer critical and the steering gear cost is reduced in spite of the added parts.

The two modifications shown in FIGURES 1 and 2 respectively are for use in pistons of any size where access can be had to the seat from the right hand side only as in FIGURE 1 and from the left hand side in FIGURE 2. However the design shown in FIGURE 1 has been found preferable for larger gears and the modification shown in FIGURE 2 seems best for smaller gears.

What I claim is:

1. In a power steering device for vehicles, the combination with a cylinder, a piston slidable therein and having internal grooves, a valve slidable within the piston and having cooperating external grooves, and a pair of spaced annular springs urging the valve to mid-position, the valve having proximate each end thereof an annular seat for the proximate spring; of means for centralizing an external groove of the valve in relation to internal grooves in the piston to insure equal reversibility: said means comprising two spaced members each adjustable axially with respect to the piston and each having an annular spring seat engaging the opposite portion of the proximate spring, and means for independently locking each of said members in its adjusted position, a ring slidable in the piston forming one of said spaced members, and an internally splined nut having threaded engagement with the piston holds the ring in contact with the proximate spring and thus is part of the centralizing means.

2. The combination of claim 1 in which the ring is of harder material than the nut and the splined nut is held in adjustable position by a pin locking the nut to the piston, said pin being a portion of the locking means.

References Cited by the Examiner
UNITED STATES PATENTS 2,897,792 8/59 Baltus et al. _____ 137—625.62
3,092,083 6/63 Sheppard _____ 91—378

M. CARY NELSON, *Primary Examiner.*

MARTIN P. SCHWADRON, *Examiner.*